(12) United States Patent
Nolin

(10) Patent No.: US 7,028,824 B1
(45) Date of Patent: Apr. 18, 2006

(54) FLOW-RETARDING SPOUT AND METHOD FOR DELIVERING DRY BULK FREE-FLOWING MATERIAL TO A LOWER LOCATION

(76) Inventor: Karl W. Nolin, 1510 Country Club La., Spencer, IA (US) 51301

( * ) Notice: Subject to any disclaimer, the term of this patent is extended or adjusted under 35 U.S.C. 154(b) by 0 days.

(21) Appl. No.: 10/708,323

(22) Filed: Feb. 24, 2004

(51) Int. Cl.
*B65G 11/20* (2006.01)
(52) U.S. Cl. ............................. 193/32; 193/4; 222/477
(58) Field of Classification Search ................ 198/534, 198/532, 550.2; 193/2 R, 32, 25 FT, 40, 193/34, 3, 4; 222/564, 279, 476, 477
See application file for complete search history.

(56) References Cited

U.S. PATENT DOCUMENTS

| | | | | |
|---|---|---|---|---|
| 4,216,853 A | * | 8/1980 | Poff ............................. | 193/32 |
| 4,410,076 A | * | 10/1983 | West et al. .................... | 193/32 |
| 4,552,573 A | * | 11/1985 | Weis et al. .................... | 193/32 |

OTHER PUBLICATIONS

Page from catalog of Schlagel, Inc., Cambridge, MN, showing Spouting & Accessories, and two web pages showing company contact information and spouting and accessories.
Two pages from catalog of Willis Distributing, Benton, IL showing Square Spouting W/Removable Lid, p. 135, and Round Spouting Plain Ends, p. 133 and two web pages.
One page of catalog of Honeyville Metal Works, Topeka, IN, showing Welded-Honeyville Pipe and Angle Flange Rigs and three web pages of honeyvillemetal.com.
Catalog page of Sidney Manufacturing Company, Sidney, Ohio, as well as a web page for Sidney.
One page from a catalog of Sudenga Industries, George, IN, as well as four web pages showing Sudenga Industries.
One page of Catalog No. 30.215 (Rev. 4/02) of Thermo Ramsey of Minneapolis, MN.
A three-page brochure entitled "Accurate Feeding of Dry Bulk Materials" of Thermo Ramsey, Minneapolis, MN.
Pages 3 and 14, as well as cover page of the 2004 Catalog of Nolin Milling, Inc. showing Plain End Spouting, as well as Square and Rectangular Spouting.

* cited by examiner

*Primary Examiner*—James R. Bidwell
(74) *Attorney, Agent, or Firm*—Simmons, Perrine, Albright & Ellwood, PLC

(57) ABSTRACT

A system and method for causing a differential flow rate to exist in a downspout so as to reduce abrasion of a bottom side of said downspout and to sort dry bulk material flowing therethrough. The present invention reduces the velocity of the mass of the dry bulk material, such as corn, thus preserving grain quality and reducing the exit velocity at the lower end of the spout.

30 Claims, 3 Drawing Sheets

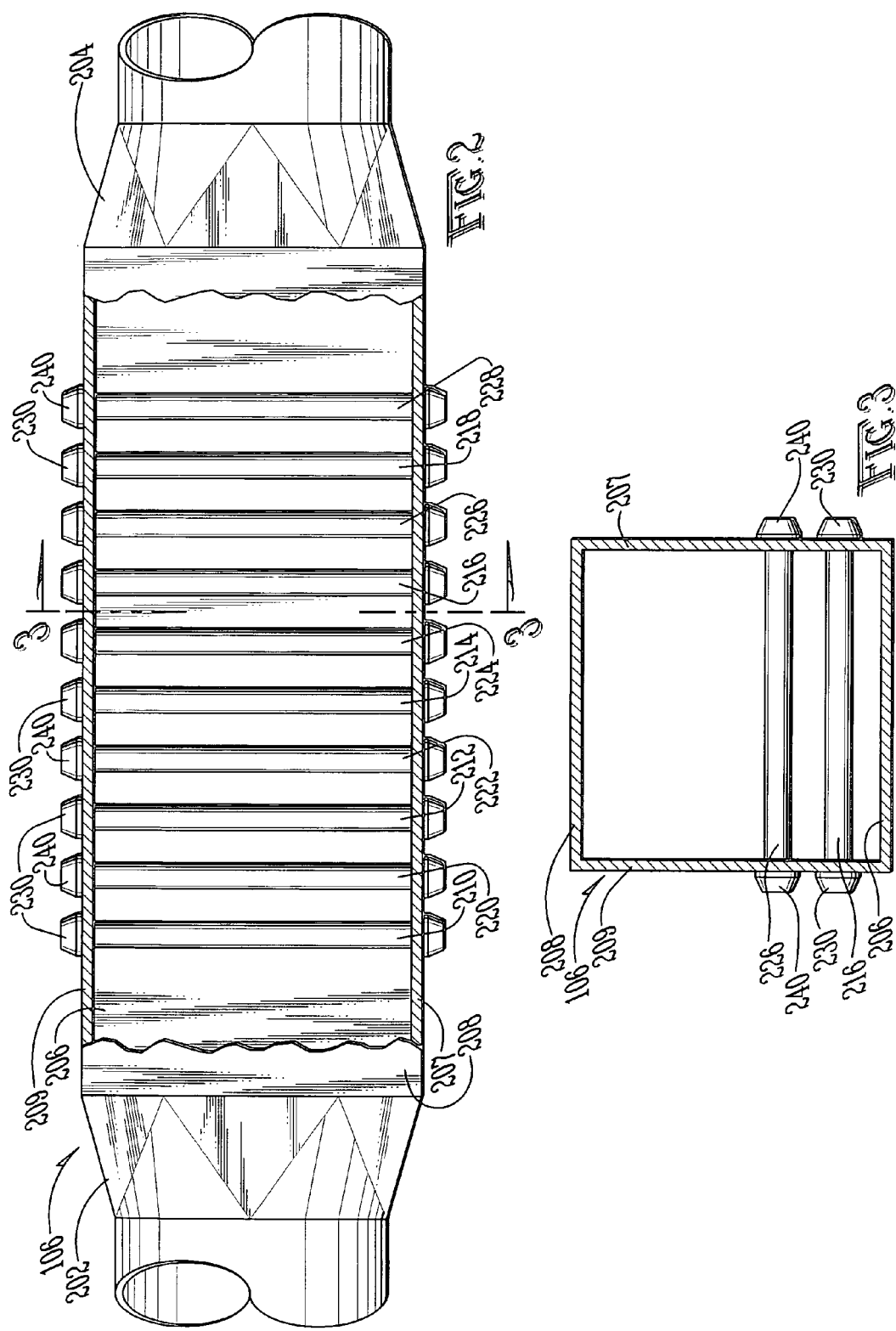

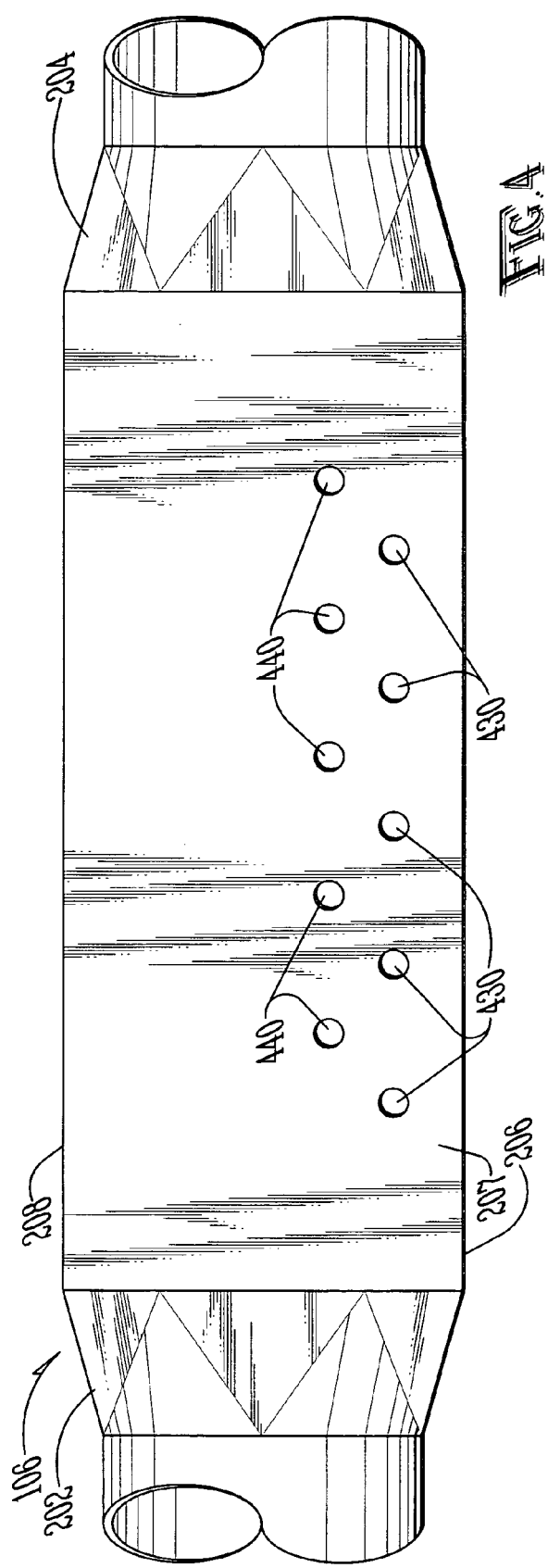

though it has been used extensively in the past,
FLOW-RETARDING SPOUT AND METHOD FOR DELIVERING DRY BULK FREE-FLOWING MATERIAL TO A LOWER LOCATION

BACKGROUND OF INVENTION

In recent years, grain elevators and feed mills have necessarily become increasingly efficient in their operations. Many customers of elevators and feed mills now operate on a "just-in-time" basis. Consequently, it is becoming increasingly important to minimize the duration of any elevator or mill downtime.

In the past, grain handling equipment manufacturers have manufactured downspouts which carried material downward, via gravity feed, from an elevated position. Typically, these downspouts were round and would wear out at their bottom surface because of the abrasion of the grain or other material flowing through the spout. Typically, these spouts would need to be rotated and/or replaced frequently, depending upon the nature of their use. One attempt to prolong the time between replacement of the downspouts has been to employ rectangular-shaped downspouts.

While these round and rectangular spouts have enjoyed much success and have been used extensively in the past, they do have some drawbacks.

First of all, the frequency of replacement or maintenance of these spouts has been less than desirable.

Secondly, maintenance, repair and/or replacement of these spouts often require considerable downtime for unloading, loading or transfer operations and depending upon the spout, may completely shut down the entire unloading operation while the replacement is performed.

Thirdly, because these downspouts are often very long and extremely heavy, they often require the use of a crane to support and lift the spouts.

The grain handling industry in particular has been primarily concerned with transporting, transferring, and storing grain. Other than measurement and classification of grain, little or no attempts have been made to address the problems associated with foreign matter in the grain. A typical scenario could have a farmer delivering corn to a grain elevator. Upon arrival, the incoming grain is assayed to determine several characteristics, which typically include moisture content and amount of foreign matter in the corn. If a farmer delivers grain with 4% foreign matter and 96% quality grain, a higher price per unit weight may be received than would be if the corn had 6% foreign matter and 94% quality corn. This assumes that a classification exists where corn of 95% or better receives a higher price than less than 95%. Typically, the assay is done on a container-by-container basis so the assay applies to all corn within the container. A farmer who delivers the 94% corn would like to somehow separate the corn, if possible, into two groups; corn of 95% or better and the lesser quality group. At least with this separation, the farmer is entitled to receive the higher price for at least a portion of the delivery.

Consequently, there exists a need for improved methods and systems for providing, maintaining, repairing and replacing equipment for delivering dry bulk material in an efficient manner, as well as improved methods and systems for separating grain into groups having differing percentages of foreign matter.

SUMMARY OF INVENTION

It is an object of the present invention to provide a system and method for delivering dry bulk material in an efficient manner.

It is a feature of the present invention to utilize a downspout with internal bottom surface flow-retarding members.

It is an advantage of the present invention to extend the service life of a downspout.

It is another advantage of the present invention to cause a separation of the dry bulk material into groups of differing characteristics as the dry bulk material flows through the downspout.

It is another feature of the present invention to have said internal bottom surface flow-retarding members be replaceable.

It is another advantage of the present invention to permit some servicing of the downspout without any need to move the spout itself.

It is yet another feature of the present invention to include multiple rows of flow-retarding members.

It is yet another advantage of the present invention to permit a variable depth of an area within the spout where reduced flow rates exist.

It is yet another feature of the invention to provide for variably sized flow-retarding members so as to adapt the system for differing types of dry bulk material.

It is another advantage of the invention to tailor performance of the system of the present invention to particular uses.

The present invention is an apparatus and method for delivering dry bulk material to a lower position, designed to satisfy the aforementioned needs, provide the previously stated objects, include the above-listed features, and achieve the already articulated advantages. The present invention is carried out in a "wasted time-less" manner in a sense that the time consumed in replacing spouts has been greatly reduced. The present invention is also carried out in an automatic dry bulk material-sorting manner, in the sense that some sorting of dry bulk material flowing through the downspout occurs automatically.

Accordingly, the present invention is a system and method including a spout having internal baffles or flow-retarding members therein.

BRIEF DESCRIPTION OF DRAWINGS

The invention may be more fully understood by reading the following description of the preferred embodiments of the invention, in conjunction with the appended drawings wherein:

FIG. 2 is a top partial cut-away view of the spout of the present invention.

FIG. 3 is a cross-section view of the spout of FIG. 2 taken on line 3—3.

FIG. 4 is a side view of the spout of the present invention without the end caps in place.

DETAILED DESCRIPTION

Figure 1:
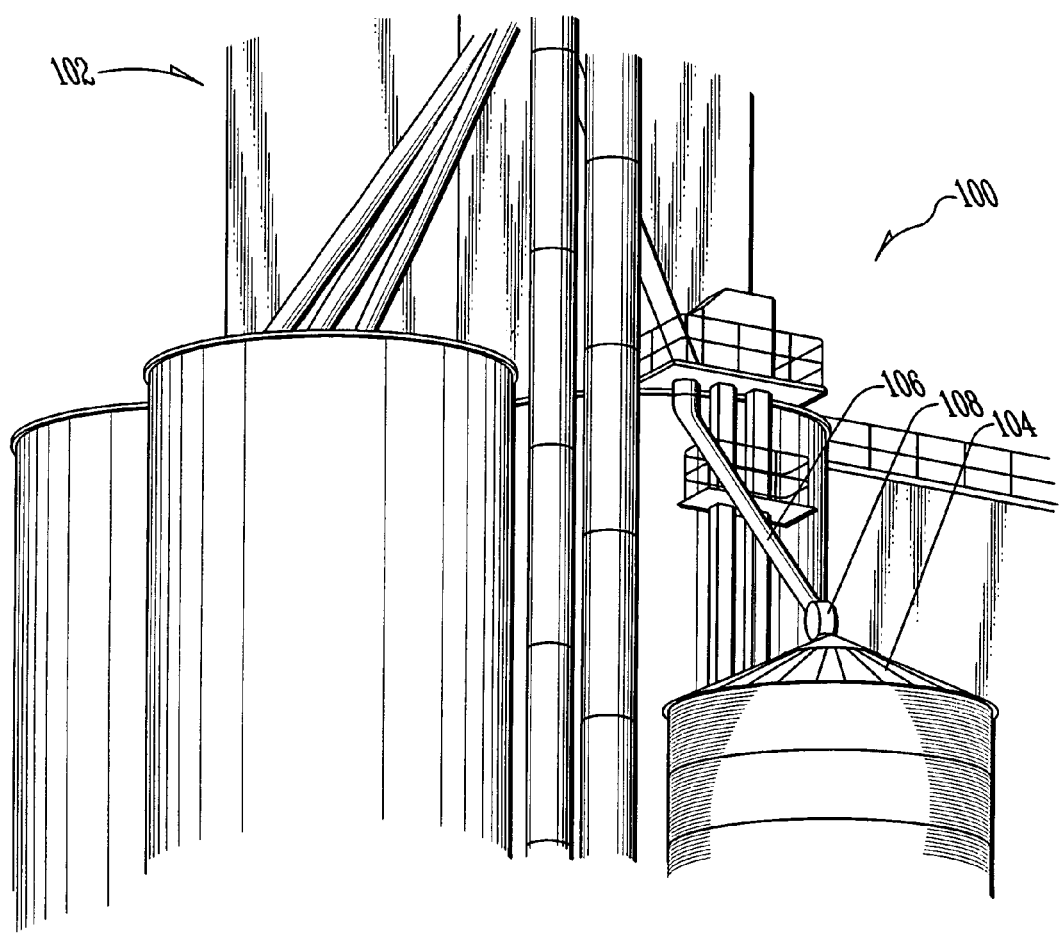
FIG. 1 is a perspective view of a grain elevator system of the present invention.

Now referring to the drawings wherein like numerals refer to like matter throughout, and more specifically referring to FIG. 1, there is shown a grain elevator system of the present invention generally designated 100, including an elevated position 102 from which grain or other dry bulk material is provided to a grain bin 104, via an angled gravity flow-retarding downspout 106 with an adjustable spout end 108 disposed at its lower end. The entire grain elevator system 100, except for gravity flow-retarding downspout 106, is well known in the industry.

Now referring to FIG. 2, there is shown a more detailed partially cut-away top view of the downspout 106 of FIG. 1, which shows a portion of the top plate of the downspout 106 cut-away. Downspout 106 is shown here as a rectangular spout because it is believed that this is preferred. However, it should be understood that the innovative concepts of the present invention could be employed with circular spouts or spouts of other shapes as well. Downspout 106 is shown having a downspout first end 202, an opposite downspout second end 204, a downspout bottom side 206, and an opposing downspout top side 208. Downspout first side 207 and downspout opposite side 209 are also shown. Extending between downspout first side 207 and downspout opposite side 209 is lower flow-retarding member 210 and upper flow-retarding member 220, as well as lower flow-retarding members 212–218, and upper flow-retarding members 222–228. The material used for downspout bottom side 206 and the lower flow-retarding member 210 is preferably steel, all types. It is preferred that the lower flow-retarding member 210 and upper flow-retarding member 220 are solid cylindrical bars which do not rotate when finally deployed for service and placed into operation. In another embodiment, the bars are free to rotate. However, in either embodiment, the bars may be other shapes and configurations, depending upon the particular needs of any application.

If the downspout 106 is used to replace an existing downspout, preferably the cross sectional area of the downspout 106 is larger than the one it is replacing, owing to the flow-retarding effect of the lower flow-retarding members 210–218 and the upper flow-retarding members 220–228.

Lower flow-retarding member end cap 230 and upper flow-retarding member end cap 240 are shown disposed over ends of lower flow-retarding member 210 and upper flow-retarding member 220, respectively. These caps serve to prevent the lower flow-retarding members and the upper flow-retarding members from falling into the dry bulk material if they wear through in the center. These caps may be attached to their respective members in a threaded nut and bolt arrangement, with pins, keys, etc. In a preferred embodiment, the lower flow-retarding members 210–218 and the upper flow-retarding members 220–228 do not rotate when dry bulk material flows through the downspout 106.

Now referring to FIG. 3, there is shown a cross-sectional view of the downspout 106 of FIGS. 1 and 2 taken on line 3—3 of FIG. 2. The upper flow-retarding member 226 is disposed above and toward the downspout second end 204 of the downspout 106.

Now referring to FIG. 4, there is shown a side view of a downspout 106 of FIGS. 1–3, where the lower flow-retarding member end caps and the upper flow-retarding member end caps have been removed. The lower flow-retarding member receiving holes 430 and upper flow-retarding member receiving holes 440 are shown.

Throughout this description, reference is made to grain, grain handling, grain elevators, grain bins and to feed and feed mills, because it is believed that the beneficial aspects of the present invention would be most readily apparent when used in connection with grain and feed; however, it should be understood that the present invention is not intended to be limited to grain and feed handling and should be hereby construed to include other agricultural and non-agricultural applications as well. For example only, and not intended as a limitation, the dry bulk material may be corn, soybeans, wheat, rice, almonds, walnuts, peas, coffee beans, paint pigment, or any free-flowing dry bulk material. The term "dry bulk material" is intended to refer to the above-listed materials and other materials having similar properties.

In operation, the bulk material delivery system of the present invention could be operated in a low maintenance manner as follows:

1. An angled gravity flow downspout 106 is coupled at its upper end to a source of dry bulk material.
2. Dry bulk material flows through the downspout 106, where some impacts the lower flow-retarding members and the upper flow-retarding members.
3. The dry bulk material disposed adjacent to the downspout bottom side 206 flows with a much reduced flow rate in comparison to dry bulk material flowing through a section of the downspout 106 which is free from lower flow-retarding members and upper flow-retarding members. It is believed that the slower velocity of dry bulk material passing over the bottom side of downspout 106 results in less abrasion to the downspout, thereby extending its service life.

In operation, the bulk material delivery system 100 of the present invention could be at least partially maintained as follows:

1. A worker, without a crane other than a cherry picker type personnel hoist, can remove from the downspout the existing flow-retarding members.
2. A new or different sized flow-retarding member which is sized appropriately for the particular type of dry bulk material flowing through the downspout is inserted into the downspout. It should be noted that to optimize performance that if the dry bulk material is corn, a different sized flow-retarding member can be used than would be used if oats were the dry bulk material.
3. The caps or other flow-retarding member retaining devices are attached to reduce contamination of the dry bulk material by preventing from dropping into the dry bulk material, ends of the flow-retarding member which may become worn through in the center.

The innovative downspout 106 of the present invention could be used in an innovative method for sorting dry bulk material as follows (corn will be used as an example of dry bulk material):

1. Corn having non-homogenous foreign matter characteristics is caused to flow through the downspout 106 into a first bin.
2. Corn which collects near the bottom side of the downspout tends to have different characteristics from corn flowing through the upper portion of the downspout. For example, if a kernel of corn is broken and its inside has been exposed to the air and is allowed to expand, it has a higher tendency to be found along the flow-retarding bars than does an undamaged kernel of corn. Similarly, corn stalk, and corncob pieces are also more likely to collect near the flow-retarding members.
3. The corn exiting the downspout is diverted from flowing into the first bin so as to accumulate at a second corn collection position.
4. The flow of corn through the downspout is terminated and the downspout is allowed to drain completely into the second corn collecting position. Since the material near the flow-retarding bars is the last to discharge from the downspout, it is collected in the second corn collecting position. As stated above, the damaged corn and other foreign matter tends to be the last dry bulk material to leave the downspout.

5. Once the downspout 106 has fully emptied, the flow of corn is redirected back to the first bin and the flow through the downspout 106 is resumed.
6. The process is repeated until all the corn has passed through the downspout.

Due to the fact that the corn which tends to collect near the flow-retarding members has different characteristics on average than the remainder of the corn, the above process can be used to separate corn into groups having differing characteristics.

Numerous variables will affect how the sorting process is performed. Variables, such as the type of material being sorted (corn, beans, oats, etc.), the nature and extent of the foreign matter and the non-homogeneity of the material (damaged grain, wet grain, plant stalks and other foreign matter), the angle of the downspout, the flow rate of material, the size, number and orientation of the flow-retarding members, may affect the details of how the sorting is accomplished. The applicant is not asserting that the present invention will sort out every piece of damaged corn from a truckload. However, it is very valuable to sort the corn into two separate piles having differing characteristics; e.g., if a truckload of corn in aggregate is 94% corn and 6% foreign matter or damaged corn, then it can be helpful to separate it into two collections—one of 95% corn and 5% foreign matter and another pile with a higher percentage of foreign matter.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. A system for delivery of dry bulk material, the system comprising:
   a downspout, having a top side, a bottom side, a right side and a left side, an inlet end and an outlet end, the downspout for receiving in the inlet end, carrying, and discharging from the outlet end, a dry bulk material along a longitudinal axis;
   a plurality of flow-retarding members disposed in said downspout, and spanning a space near said bottom side and between said right side and said left side;
   means for retaining said flow-retarding members at a predetermined location;
   where a minimum distance between a bottom edge of each of said plurality of flow-retarding means and said bottom side is greater than a predetermined dimension representative of a largest dimension of a typical piece of the dry bulk material; and
   said downspout configured so that dry bulk material disposed above said plurality of flow-retarding members and flowing generally along said longitudinal axis, may be discharged from said outlet end while remaining above said plurality of flow-retarding members, and while maintaining a flow generally along said longitudinal axis.

2. A system for delivery of dry bulk material, the system comprising:
   a downspout, having a top side, a bottom side, a right side and a left side, the downspout for carrying a dry bulk material;
   a plurality of flow-retarding members disposed in said downspout, and spanning a space near said bottom side and between said right side and said left side;
   means for retaining said flow-retarding members at a predetermined location;
   where a minimum distance between a bottom edge of each of said plurality of flow-retarding means and said bottom side is greater than a predetermined dimension representative of a largest dimension of a typical piece of the dry bulk material; and
   said plurality of flow-retarding members are inserts configured so as to be inserted through at least one of the right side and the left side.

3. A system for delivery of dry bulk material, the system comprising:
   a downspout, having a top side, a bottom side, a right side and a left side, the downspout for carrying a dry bulk material;
   a plurality of flow-retarding members disposed in said downspout, and spanning a space near said bottom side and between said right side and said left side;
   means for retaining said flow-retarding members at a predetermined location;
   where a minimum distance between a bottom edge of each of said plurality of flow-retarding means and said bottom side is greater than a predetermined dimension representative of a largest dimension of a typical piece of the dry bulk material;
   said plurality of flow-retarding members are inserts configured so as to be inserted through at least one of the right side and the left side; and
   wherein said inserts are solid cylindrical metal bars.

4. A system of claim 3 wherein said means for retaining flow-retarding members comprise structures coupled to the solid cylindrical metal bars outside of said downspout.

5. A system of claim 4 wherein said structures are threaded caps.

6. A system for delivery of dry bulk material, the system comprising:
   a downspout, having a top side, a bottom side, a right side and a left side, the downspout for carrying a dry bulk material;
   a plurality of flow-retarding members disposed in said downspout, and spanning a space near said bottom side and between said right side and said left side;
   means for retaining said flow-retarding members at a predetermined location;
   where a minimum distance between a bottom edge of each of said plurality of flow-retarding means and said bottom side is greater than a predetermined dimension representative of a largest dimension of a typical piece of the dry bulk material; and
   said plurality of flow-retarding members are not all disposed in a single planar arrangement.

7. A system of claim 6 wherein said plurality of flow-retarding members are disposed in a plurality of separate parallel planar arrangements.

8. A system for delivery of dry bulk material, the system comprising:
   a downspout, having a top side, a bottom side, a right side and a left side, the downspout for carrying a dry bulk material;

a plurality of flow-retarding members disposed in said downspout, and spanning a space near said bottom side and between said right side and said left side;
means for retaining said flow retarding members at a predetermined location;
where a minimum distance between a bottom edge of each of said plurality of flow-retarding means and said bottom side is greater than a predetermined dimension representative of a largest dimension of a typical piece of the dry bulk material;
wherein said plurality of flow-retarding members are disposed in a plurality of separate parallel linear arrangements;
wherein said plurality of flow-retarding members are not all disposed in a single linear arrangement; and
wherein none of said plurality of flow-retarding members is disposed directly above another of said plurality of flow-retarding members when said downspout is oriented horizontally.

9. A system for delivery of dry bulk material, the system comprising:
a downspout, having a top side, a bottom side, a right side and a left side, the downspout for carrying a dry bulk material;
a plurality of flow-retarding members disposed in said downspout, and spanning a space near said bottom side and between said right side and said left side;
means for retaining said flow-retarding members at a predetermined location;
where a minimum distance between a bottom edge of each of said plurality of flow-retarding means and said bottom side is greater than a predetermined dimension representative of a largest dimension of a typical piece of the dry bulk material; and
wherein said plurality of flow-retarding members are replacements of earlier installed bars, wherein a difference in diameter between said plurality of flow-retarding member and said earlier installed bars exists.

10. A system for delivery of dry bulk material, the system comprising:
a downspout, having a top side, a bottom side, a right side and a left side, the downspout for carrying a dry bulk material;
a plurality of flow-retarding members disposed in said downspout, and spanning a space near said bottom side and between said right side and said left side;
means for retaining said flow-retarding members at a predetermined location;
where a minimum distance between a bottom edge of each of said plurality of flow-retarding means and said bottom side is greater than a predetermined dimension representative of a largest dimension of a typical piece of the dry bulk material; and
wherein said means for retaining are threaded caps.

11. A method of maintain an elevated downspout which is configured for carrying gravity fed dry bulk material, the method comprising the steps of:
disconnecting a flow-retarding bar retainer from a first flow-retarding bar which extends through a hole in a first side of said downspout to an opposing side;
removing said first flow-retarding bar from said downspout;
inserting in said hole a replacement flow-retarding bar which spans from said first side to said second side; and,
connecting a flow-retarding bar retainer to said replacement flow-retarding bar.

12. A method of claim 11 wherein said step of disconnecting comprises unscrewing a first threaded cap from a first end of said first flow-retarding bar.

13. A method of claim 12 further comprising the steps of removing a second threaded cap from a second end of said first flow-retarding bar.

14. A system for delivering dry bulk material from an elevated location comprising:
a source of dry bulk material;
a downspout extending downward from said source of dry bulk material;
said downspout comprising:
a top side,
a first side, coupled to said top side;
a second side coupled to said top side;
a bottom side coupled to said first side and said second side;
means for causing dry bulk material flowing through said downspout to exhibit a slower velocity near said bottom side than at said top side, while permitting dry bulk material disposed above said means for causing to exit said downspout while remaining above said means for causing.

15. A system of claim 14 further comprising:
means for retaining, within said downspout, said means for causing.

16. A system of claim 15 wherein said means for retaining further permits replacement of said means for causing without requiring said downspout to be disconnected from said source of dry bulk material and without dismantling a portion of said downspout.

17. A system of claim 15 wherein said means for causing comprises a plurality of elongated bars.

18. A system for delivering dry bulk material from an elevated location comprising:
a source of dry bulk material;
a downspout extending downward from said source of dry bulk material;
said downspout comprising;
a top side,
a first side, coupled to said top side;
a second side coupled to said top side;
a bottom side coupled to said first side and said second side;
means for causing dry bulk material flowing through said downspout to exhibit a slower velocity near said bottom side than at said top side;
means for retaining, within said downspout, said means for causing;
wherein said means for causing comprises a plurality of elongated bars; and
wherein each of said plurality of elongated bars is cylindrical.

19. A system of claim 18 wherein said downspout has a rectangular cross section.

20. A system of claim 19 wherein said plurality of elongated bars are disposed nearer to said bottom side than said top side and span between said first side and said second side.

21. A method for sorting dry bulk material comprising the steps of:
providing a first location for collection of dry bulk material;
providing a second location for collection of dry bulk material;
providing a downspout having a plurality of flow-retarding members disposed therein in a serial arrangement running along a major axis of said downspout where a first flow-retarding member in a series is disposed near an upper section of said downspout and a last flow-retard member in said series is disposed at a lower section of said downspout;

causing dry bulk material to create a first flow through said downspout;

allowing the dry bulk material to flow into the first location until a first one of the following events occurs:
a time period elapses; and,
an amount of dry bulk material is allowed to flow into said first location;

diverting said dry bulk material to said second location; and, terminating flow of dry bulk material through said downspout and allowing the downspout to completely drain of dry bulk material into said second location.

22. A method of claim 21 further comprising the steps of:

causing dry bulk material to again flow through the downspout and redirecting dry bulk material into said first location;

allowing the dry bulk material to flow into the first location until a first one of the following events occurs:
a predetermined time period elapses; and,
a predetermined amount of dry bulk material is allowed to flow into said first location;

diverting said dry bulk material to said second location; and, terminating flow of dry bulk material through said downspout and allowing the downspout to completely drain of dry bulk material into said second location.

23. A method of claim 22 wherein said predetermined amount of dry bulk material is a fixed volume.

24. A method of claim 22 wherein said predetermined amount of dry bulk material is based upon a remainder amount of dry bulk material yet to be allowed to flow through the downspout which is remaining in a third location.

25. A method of claim 24 wherein said third location is an elevated location above said first and said second locations.

26. A method of claim 21 wherein said plurality of flow-retarding members comprises a plurality of elongated bars extending across said downspout.

27. A method of claim 26 wherein said plurality of bars are inserted through a hole in a side of said downspout and span across said downspout to an opposing side.

28. A method of claim 27 wherein each of said plurality of bars is readily replaceable by removing a bar retainer and pulling the bar through the hole and inserting a replacement bar through said hole.

29. A method of claim 28 wherein said dry bulk material is grain.

30. A method of claim 29 wherein said grain is transported from said first location and said second location and sold to one purchaser as grain having different characteristics and receiving differing prices per unit weight for grain from said first location and said second location.

* * * * *

UNITED STATES PATENT AND TRADEMARK OFFICE
CERTIFICATE OF CORRECTION

PATENT NO. : 7,028,824 B1
APPLICATION NO. : 10/708323
DATED : April 18, 2006
INVENTOR(S) : Karl W. Nolin It is certified that error appears in the above-identified patent and that said Letters Patent is hereby corrected as shown below:

In Claim 9, column 7, line 38, please delete the word "member" and insert therfor --members--.

In Claim 11, colum 7, line 55, please delete the word "maintain" and insert therfor --maintaining--.

Signed and Sealed this

Fifteenth Day of August, 2006

JON W. DUDAS
*Director of the United States Patent and Trademark Office*